(12) United States Patent
Xie et al.

(10) Patent No.: US 11,053,005 B2
(45) Date of Patent: Jul. 6, 2021

(54) CIRCULAR LIGHT SOURCE FOR OBSTACLE DETECTION

(71) Applicant: SZ DJI TECHNOLOGY CO., LTD., Shenzhen (CN)

(72) Inventors: Jiebin Xie, Shenzhen (CN); Wei Ren, Shenzhen (CN); Weisi Ma, Shenzhen (CN); Zhipeng Zhan, Shenzhen (CN); Shuhan Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 140 days.

(21) Appl. No.: 16/252,172

(22) Filed: Jan. 18, 2019

(65) Prior Publication Data
US 2019/0152598 A1     May 23, 2019

Related U.S. Application Data

(63) Continuation of application No. PCT/CN2016/090678, filed on Jul. 20, 2016.

(51) Int. Cl.
*B64C 39/02*     (2006.01)
*G01S 17/36*     (2006.01)
(Continued)

(52) U.S. Cl.
CPC ............ *B64C 39/024* (2013.01); *B64D 47/02* (2013.01); *B64D 47/04* (2013.01); *G01S 7/4814* (2013.01);
(Continued)

(58) Field of Classification Search
CPC ...... B64C 39/024; B64D 47/02; B64D 47/04; B64D 2203/00; G01S 7/4814;
(Continued)

(56) References Cited

U.S. PATENT DOCUMENTS

| | | | | |
|---|---|---|---|---|
| 505,414 | A | * | 9/1893 | Smith .................... B64D 47/04 362/470 |
| 3,505,528 | A | * | 4/1970 | Lipshutz ............... G01S 7/4816 250/216 |

(Continued)

FOREIGN PATENT DOCUMENTS

| | | |
|---|---|---|
| CN | 104678403 A | 6/2015 |
| CN | 204649963 U | 9/2015 |
| CN | 205826860 U | 12/2016 |

OTHER PUBLICATIONS

The World Intellectual Property Organization (WIPO) International Search Report and Written Opinion for PCT/CN2016/090678 dated Apr. 27, 2017 8 pages.

*Primary Examiner* — Behrang Badii
*Assistant Examiner* — Daniel L Greene
(74) *Attorney, Agent, or Firm* — Anova Law Group, PLLC (57) ABSTRACT

An apparatus includes a light source configured to emit light, a beam shaper configured to project the light to substantially surround the apparatus in a plane and onto an object in the plane, and a receiver configured to project the light reflected from the object in the plane to an image sensor. A distortion parameter of the receiver in conjunction with a difference between the emitted light and the reflected light detected at the image sensor is indicative of at least one of a direction or a distance of the apparatus relative to the object.

20 Claims, 7 Drawing Sheets

(51) Int. Cl.
*G01S 17/933* (2020.01)
*G01S 7/481* (2006.01)
*G01S 17/42* (2006.01)
*B64D 47/02* (2006.01)
*B64D 47/04* (2006.01)
*H04N 5/374* (2011.01)

(52) U.S. Cl.
CPC .......... *G01S 7/4815* (2013.01); *G01S 7/4816* (2013.01); *G01S 17/36* (2013.01); *G01S 17/42* (2013.01); *G01S 17/933* (2013.01); *H04N 5/374* (2013.01); *B64D 2203/00* (2013.01)

(58) Field of Classification Search
CPC ........ G01S 7/4815; G01S 7/4816; G01S 7/42; G01S 7/36; G01S 17/36; G01S 17/42; G01S 17/933; H04N 5/374
See application file for complete search history.

(56) References Cited

U.S. PATENT DOCUMENTS

2010/0006034 A1\* 1/2010 Van Den Berg ..... A01K 5/0266
  119/14.18
2017/0243373 A1\* 8/2017 Bevensee ................ G03B 35/10
2017/0365970 A1\* 12/2017 Uyeno .................... G01S 17/42
2018/0143320 A1\* 5/2018 Steever .................. G01S 17/36

\* cited by examiner

CIRCULAR LIGHT SOURCE FOR OBSTACLE DETECTION

CROSS-REFERENCE TO RELATED APPLICATION

This application is a continuation of International Application No. PCT/CN2016/090678, filed on Jul. 20, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Obstacle detection is important for many applications that involve automated or semi-automated actions. Self-driving cars and cars with driving assistance, for instance, require obstacle detection to direct driving and avoid clash. Devices that can move to any direction at a given time, such as walking robots and aerial vehicles, can benefit from obstacle detection at all directions as well.

Unmanned aerial vehicles (UAV), also known as drones, can perform certain automated and semi-automated functions. To enhance safety and prevent collision, it is desirable for a drone to detect obstacles at all directions when flying in the air. Time of Flight (TOF) is a method that may be used to determine the distance based on the difference between the time of emission and time of reception. The common TOF methods, however, can only cover a small Field of View (FOV), depending on the angle of the signal source and/or the optical parameters of the receiving element. For example, the FOV of a detection module (detector) is typically in a range of 30° to 60°. For covering larger fields, multiple detection modules are required, which increase costs and size of the drone.

SUMMARY

Described are systems and methods useful for detecting obstacles from all directions by a device, such as a movable object or a device that can be coupled to a movable subject. The device may be equipped with one or more light sources that emit light to substantially surround the device, and a reception element adapted to receive the light being reflected from an obstacle and project to an image sensor. The light emitted from the light source(s) may be projected by a beam-shaping element to cover a 360° range in a plane about a periphery of the device.

In some embodiments, systems and methods are provided to determine the location of the obstacle relative to the device. For instance, the direction of the obstacle relative to the device may be determined based on a distortion parameter of the reception element and the angle at which the reflected light is received at the image sensor. The distance of the obstacle relative to the device may be determined based on phase differences and intensities of the emitted light and the reflected light.

In some embodiments, the detection of obstacles from all directions in a plane may enhance safety of the device during its movement and provide navigation guidance or any other information useful for the device. For instance, the detected information of the obstacles may assist the movable object to navigate through a path in the environment, preventing collision and damage.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION

Certain description as follows describes systems and methods of detecting obstacles by an unmanned aerial vehicle (UAV), for example. It will be apparent to those skilled in the art that such systems and methods can be used by other types of movable devices (e.g., an unmanned wheeled vehicle, an unmanned watercraft) without limitation.

The present disclosure, in one embodiment, provides systems and methods for detecting obstacles from all directions, which may include at least emitting light to approximately surround the device (e.g., onto an object about the periphery of the device), and receiving light reflected by the object by a reception element and projecting the reflected light to an image sensor. Once the reflected light is detected and measured by the image sensor, the direction and/or distance of the object relative to the device may be calculated by a processing unit (processor).

The light source of the present disclosure, in one embodiment, is able to emit light to substantially all directions in a horizontal plane. It can be helpful but not required that light going to other directions (e.g., vertical directions) is limited. In this context, the directions in a horizontal plane of the device that is covered by the light source can be referred to as the horizontal directions, while the directions perpendicular to the plane of the device is referred to as the vertical directions. In other words, when a direction is referred to as a horizontal direction or a vertical direction, the direction is relative to the horizontal plane of the device and may not be parallel or perpendicular to the ground, respectively. It will be apparent to those skilled in the art that when the device is tilted (e.g., when flying sideways), the horizontal plane of the projected light is at an angle from the horizontal plane with respected to the ground.

The term "horizontal plane," as used herein, is also relative and refers to a plane in which substantially covered by light from the light source. In some instances, however, a horizontal plane of a device can be readily determined. For instance, when the device is coupled to a movable object such as an UAV, a horizontal plane may be a two-dimensional plane that is parallel to the propellers and intersects with the device.

"Substantially all directions" in a horizontal plane, as used herein, refers to a coverage of at least about 80% of the 360° angle in the plane. In some embodiments, the coverages is at least about 85%, 90%, 95%, 98%, 99% or more. The coverage, it is noted, does not need to be continuous. For instance, when four light sources are used, if each covers 85°, the total coverage would be about 340°, but there may be a few gaps between the coverages. In some embodiments, it is also within the scope of the present disclosure that when multiple light sources are used, the emitted light can overlap in certain directions, which may be helpful to ensure a more complete coverage.

The device may include one or more light sources. When multiple light sources (e.g., four light sources) are used, each of the light sources is configured to project light to cover a range of directions. All of the multiple light sources, in combination, cover substantially all directions in a horizontal plane. In some instances, other numbers (e.g., two, three, five, six, seven, eight) of light sources may be used to achieve the desired coverage in the plane. In another embodiment, the device may include a single light source, which may be projected to surround the device, such as by a circular cone reflector.

Light from one or more light sources can be projected by a beam-shaping element (beam shaper). A beam-shaping element, as used herein, refers to a collection of one or more optical components disposed between the light source(s) and an object that may appear in the horizontal plane. The beam-shaping element can have various configurations, representatives of which are illustrated below. For example, a beam-shaping element may be a single component such as a cone reflector adapted to expand a single light source. In another example, the beam-shaping element may include a combination of multiple components (also referred to as beam-shaping "units"), such as multiple concave lenses, each of which is adapted to expand a respective light source.

The light emitted by the light source(s) may be expanded or concentrated by a beam-shaping element. For instance, a light source with a small range may be expanded by a concave surface lens to cover a larger horizontal range. In another example, instead of expanding the light, a light source with a large range (at both horizontal and vertical directions) may be concentrated by a cylindrical lens at the vertical direction, leaving the horizontal range unaffected.

Upon reflection by the object in a vicinity of the device, the light is then received by a reception element (receiver or light receiver) that is adapted to project the reflected light to an image sensor. The reception element refers to a collection of one or more optical components that is configured to project light reflected form an object and an image sensor of the device. For example, the reception element may be a single component (e.g., a fisheye lens), or a combination of multiple components (e.g., a cone reflector and a focusing lens). The reception element, in some embodiments, is adapted to collect light from any direction of the horizontal plane or its vicinity.

An image sensor suitable for certain embodiments of the present disclosure may include a circuit chip that is adapted to convert light waves to electric signals. The image sensor may include an array of pixel sensors each of which could capture light (e.g., in an active-pixel sensor (APS)). One example of the image sensor is a Complementary Metal Oxide Semiconductor (CMOS) image sensor. Detection of light at the image sensor may include obtaining location information of the pixel(s) that receives the reflected light, and/or measuring light intensity at the pixel(s). Alternatively, other types of image sensors known in the art may be used for the detection.

Data obtained by the image sensor may then be transmitted to a processing unit (processor) that is adapted to use the data to calculate the direction and/or distance of the object relative to the device. The direction of the object may be calculated based on a distortion parameter of the reception element and the angle of light received at the image sensor. The distance of the object relative to the device may be calculated based on the phase difference, speed of the light traveling through a medium in which the device is located, and a frequency of the light.

Examples of signals and/or methods useful for detecting obstacles are provided. For instance, the device may transmit a short pulse signal that is then received by the same device. The distance between the obstacle and the device is a function of the time difference between signal transmission and reception. Such a method using the short pulse signal requires high energy of the signal and high accuracy of the timer. In addition, a highly sensitive pulse receiver such as an Avalanche PhotoDiode (APD) may also be useful for detecting the short pulse signal. Alternatively, the device may transmit a continues light signal (e.g., a wave signal) with modulated amplitude, for example using Light-Emitting Diode (LED). The distance of the obstacle relative to the device can be calculated based on the phase difference between the emitted light and the reflected light that is detected by the image sensor. The continuous light signals with modulated amplitude may be measured within a time span, and thus a high energy of the light source and high sensitivity of the receiver are not required.

Figure 1:
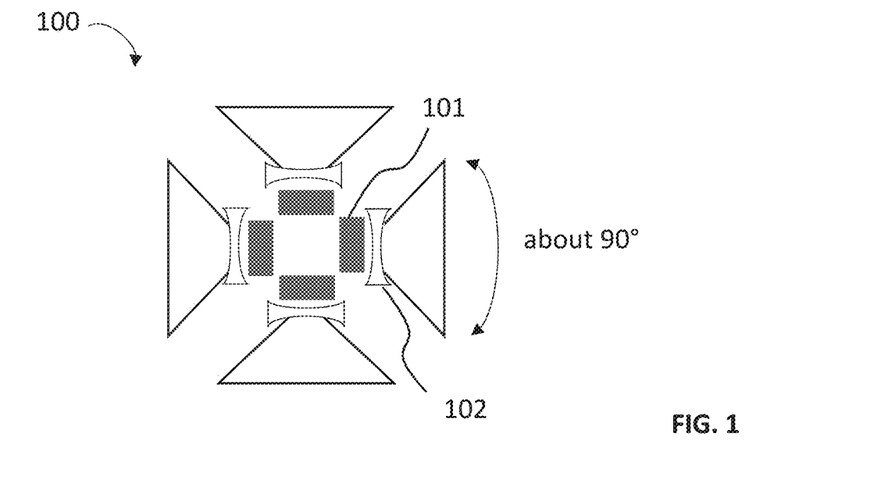
FIG. 1 illustrates a top view of a 360° light module (light source assembly) that includes multiple light sources.

FIG. 1 illustrates an example light module (100) (light source assembly) that can include multiple light sources (101) aligned in a horizontal plane (FIG. 1 being a top view of the plane). In an embodiment, the light emitted by each of the light sources (101) may be expanded, for example by a concave surface lens (102), to cover a certain horizontal range so that the light sources (101) in combination covers a horizontal 360° range. In the example of FIG. 1, four light sources (101) are shown, each of which is expanded to covers about a 90° range. In some instances, the light module (100) may include other numbers of light sources (e.g., two light sources that each covers about 180°, or three light sources that each covers about 120°, or six light sources that each covers about 60°).

The light sources (101) may be LEDs or laser diodes, along with circuitry adapted to modulate the emitted light. One example of the light signal is a light pulse, with a short span (e.g., 1-100 ns). The travel time of the signal from the device to the obstacle and back to be received by the device may be used to calculate the distance of obstacle relative to the device. In another example, the emitted light is modulated to generate a group of light pulses, such as a square wave or other phased periodic wave, at a frequency of ω. In some embodiments, the light sources (101) are near-infrared (e.g., 850 nm LEDs). Alternatively, the light sources (101) may emit light in other wavelengths. In other embodiments, any type of light sources may be used.

Also with reference to FIG. 1, four concave surface lenses (102) serve as beam-shaping units (beam-shaping optical components) of a beam-shaping element, which collectively project the emitted light to substantially surround the device in the horizontal plane. As demonstrated in FIG. 1, light emitted from each of the four light sources (101) is projected by a respective beam-shaping unit to cover a horizontal 90° range. In some instances, the beam-shaping element may include other numbers of beaming-shaping units, each adapted to expand the coverage of the light emitted from the respective light source.

Figure 2:
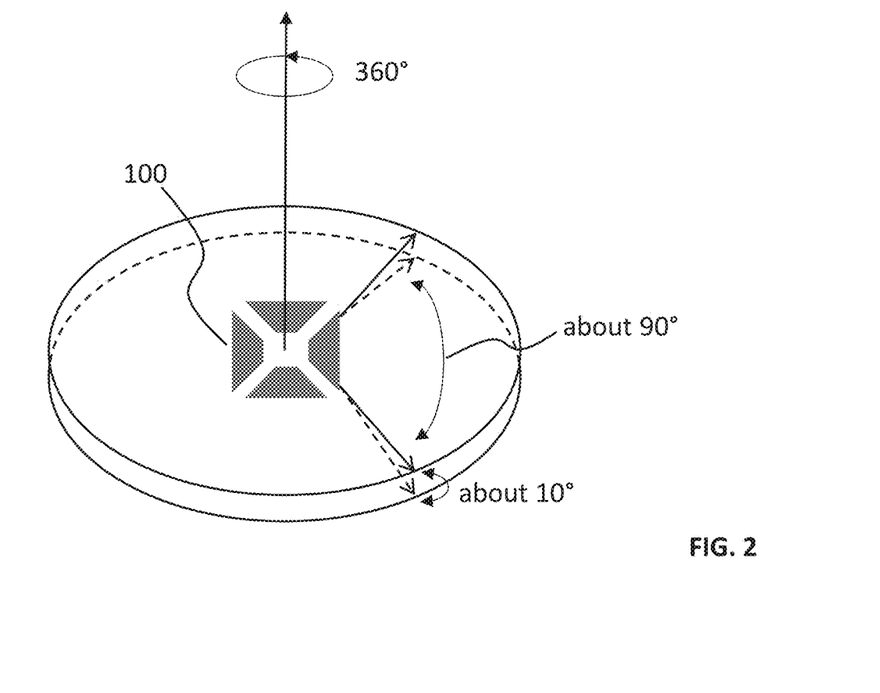
FIG. 2 illustrates a range of coverage of the light module in FIG. 1.

As an example, FIG. 2 illustrates the range of coverage of the light module (100) of FIG. 1. The light emitted by the light module (100) are projected to cover a horizontal 360° range and a small vertical range (e.g., less than 10°, less than 15°, less than 20°, 10°-20°, 10°-30°, 20°-40°, or less than 45°). In some embodiments, the vertical angel of the light sources (101) is less than 45 degrees (e.g., about 10° as shown in FIG. 2). In some instances, having some vertical coverage is helpful during movement of the device (e.g., when the drone change directions or during launching or landing).

Figure 3:
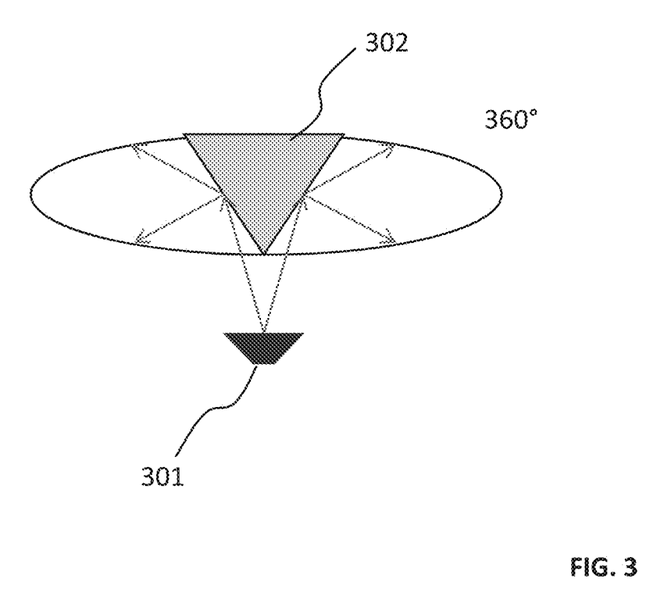
FIG. 3 illustrates a different way of covering a horizontal circular range using a single light source that is expanded with a circular cone reflector.

FIG. 3 illustrates a different way of covering a horizontal circular range using a single light source (310) that is expanded with a circular cone reflector (302). The single light source (301) may be similar to one of the multiple light sources 101 (FIG. 1). The single light source (301) may be positioned approximately concentric to the cone reflector (302), facing the tip of the cone reflector (302).

The circular cone reflector (302) is adapted to reflect the light emitted by the single light source (301) to approximately surround the device. The angle of the side to the base may be about 45°. Alternatively the cone reflector (302) may have other side angles such as those between 30° and 60°. The sides of the cone reflector (302) may be straight (as shown in FIG. 3) or curved, depending on the desired vertical coverage of the light source (301). In some embodiments, the sides have concave shapes.

Figure 4:
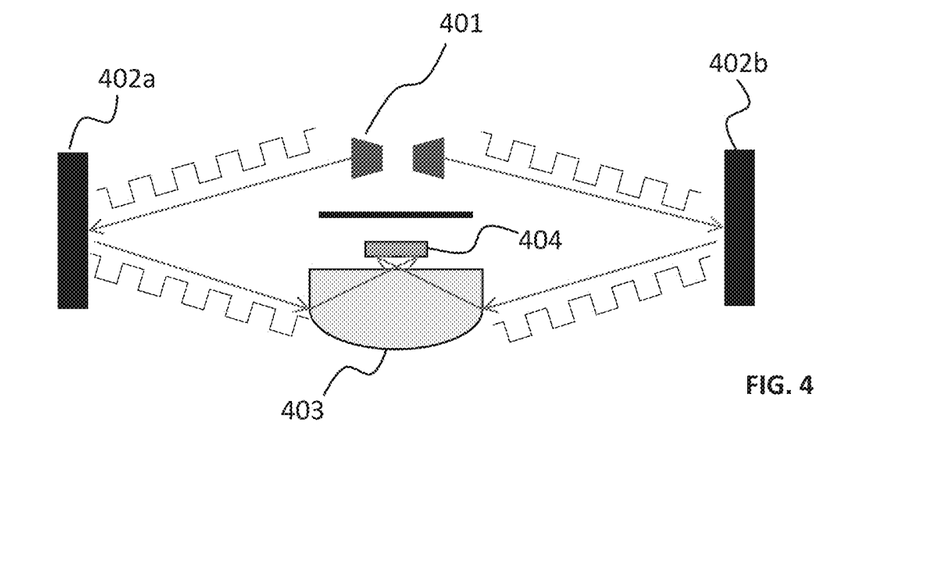
FIG. 4 illustrates an example of the reception element using a fisheye lens to project light to the image sensor.

FIG. 4 illustrates a method of detecting objects in a vicinity of the device. A side view of the device is illustrated in FIG. 4, with a light module (401) that covers 360° horizontally. The light module (401) may be similar to the light module 100 (FIGS. 1 and 2) that has four light sources, in which two opposing light sources are shown in the side view of FIG. 4. Alternatively, the light module (401) may be replaced with the single light source (301) and the cone reflector (302) (FIG. 3) to cover the horizontal 360° range.

As illustrated in FIG. 4, two objects (402a) and (402b) are located at different directions and both within the horizontal range of the emitted light, and thus can reflect light back to the device. As an example of the reception element, a fisheye lens (403) collects the light reflected from both of the objects (402a) and (402b) and then projects the reflected light to an image sensor (404). The fisheye lens (403) refers to an ultra wide-angle lens with a horizontal Field of View (FOV) of 360° and a vertical FOV of 180° and larger, for example. The fisheye lens (403) as illustrated in FIG. 4 has a vertical FOV of about 230°. Optionally, a focusing lens may be placed between the fisheye lens (403) and the image sensor (404), to focus the reflected light to the image sensor (404). Other examples of reception element may include any type of lens or combination of optical components that has a horizontal 360° range.

Figure 5:
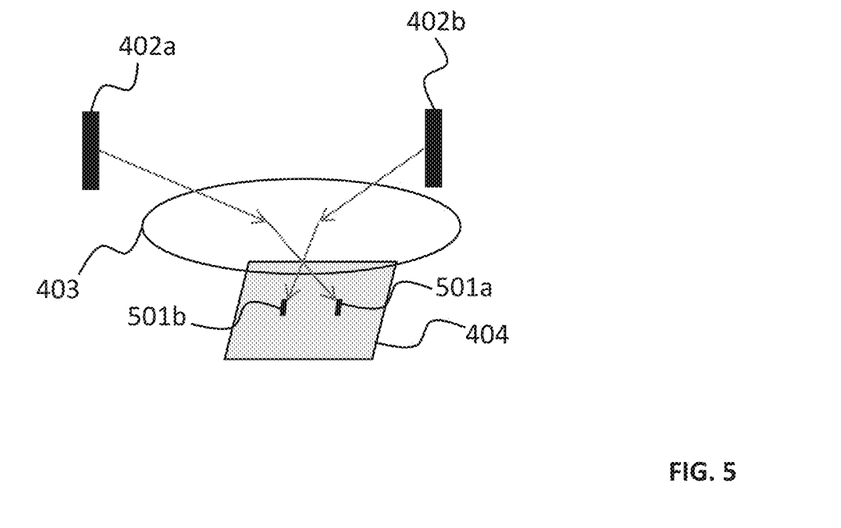
FIG. 5 illustrates a method of detecting objects in a vicinity of the device.

As further illustrated in FIG. 5, the fisheye lens (403) projects light reflected from different objects (402a) and (402b) to different pixels on the image sensor (404). For example, the light reflected by object (402a) enters the fisheye lens (403) and is then projected to a pixel(s) (501a) on the image sensor (404), while the light reflected by object (402b) is captured by a different pixel(s) (501b). Based on the distortion parameter of the fisheye lens (403) and the locations of the respective pixels that capture the reflected light, the angles/directions of the objects (402a) and (402b) relative to the device may be calculated individually.

There can be situations in which a large object, which may have multiple points, falls within the coverage of the light emitted by the device. Light reflected from each point on the large object may be projected by the reception element to a different location/pixel on the image sensor. As long as the image sensor has enough pixels (e.g., 320×240 or more), the reflected light may be detected and calculated to determine the location of each point of the large object relative to the device.

Figure 6:
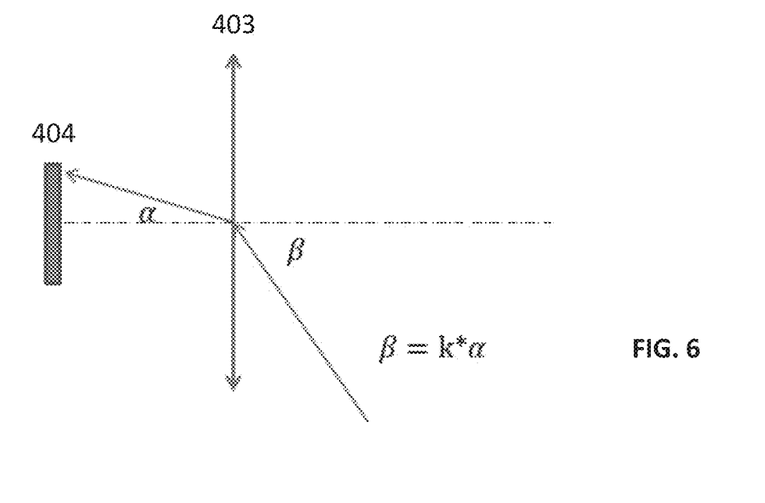
FIG. 6 illustrates a scenario of calculating the direction of the object relative to the device.

FIG. 6 illustrates a scenario of calculating the direction of the object relative to the device, based upon a correlation between the location of the pixel on the image sensor and the actual direction of the object. Taking the fisheye lens (403) (FIGS. 4-5) as an example, if the light comes into the fisheye lens (403) at an angle of β, and the angle onto the image sensor (404) is α, the angle β of the object can be calculated as β=k*α, where k is the distortion parameter of the fisheye lens (403). The angle α can be calculated using the correlation between the location of pixel(s) on the image sensor (404) that captures the light and the distance between the fisheye lens (403) and image sensor (404).

It should be appreciated that when another type of reception element (e.g., a cone reflector and a focusing lens) with a known distortion parameter is used, the angle/direction of the object may be calculated accordingly with the image sensor.

Figure 7:
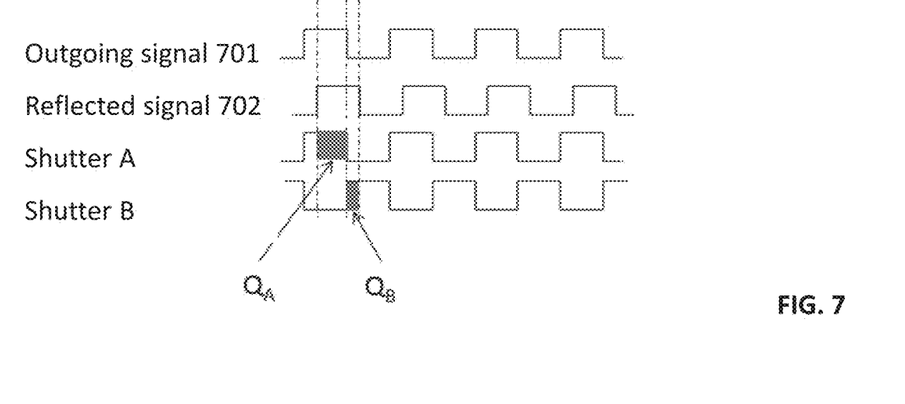
FIG. 7 illustrates a scenario of calculating the distance of the object relative to the device.

FIG. 7 illustrates a scenario of calculating the distance of the object relative to the device based on a phase difference between emitted light (outgoing signal (701)) and reflected signal (702) that is detected by the image sensor. In one embodiment, each pixel of the image sensor is connected to two capacitors A and B that serve as shutters A and B, respectively. With opening and closing of the shutters A and B, the capacitance of each of the capacitors A and B is indicative of an exposure of the pixel to the reflected light (e.g., strength of light captured by the pixel on the image sensor). For example, when shutter A opens (capacitor A is up and charging), shutter B remains closed (capacitor B is reset to 0). Then shutter A closes and the capacitance of capacitor A is used to determine the exposure A (e.g., the light intensity $Q_A$ in FIG. 7). Shutter B then opens (capacitor B is up and charging) and closes, and the capacitance of capacitor B is used to determine the exposure B (e.g., the light intensity $Q_B$ in FIG. 7), while capacitor A is reset to 0. Shutter A and shutter B have a 180 degree phase difference, for example. The phase difference between the reflected signal (702) and the outgoing signal (701) can be determined as $\Delta\varphi=Q_B/(Q_A+Q_B)$. Based on this phase difference, the distance of the object relative to the device can be calculated as $d=c*2\pi*\Delta\varphi/\omega/2$, where c is the speed of light in the medium and $\omega$ is the frequency of the pulse. The shutters A and B can be used N times to improve accuracy of distance calculation.

In some instances, the device may include more than two shutters. For example, each pixel is controlled by N×shutter A and N×shutter B, and all shutters A and B have a 180 degree phase difference. The larger number of A's and B's allows increased detection accuracy. Here, the exposure A can be determined as $Q_A=\Sigma_{i=0}^{N}Q_{A,i}$, and the exposure B can be determined as $Q_B=\Sigma_{i=0}^{N}Q_{B,i}$. The phase difference and distance then can be determined accordingly. It should be understood that light signals in other periodic wave forms (e.g., any pulse wave, sine wave, triangle wave, sawtooth wave) may be used as an alternative to the square wave signal in FIG. 7.

In some instances, the device is constantly moving, and the detection of obstacles can be instant to avoid collision during movement. For example, with each cycle of opening and closing of shutters A and B of the image sensor, a distance(s) of an obstacle(s) relative to the device is obtained. The shutters may operate at a frequency ranging between about 5 Hertz to about 1 kHertz, providing instant data about relative distance of the obstacle(s) during movement of the device. For example, the shutters A and B of FIG. 7 may operate at a frequency of 10 Hz. If the shutter frequency is too high (the charging time of the capacitors would be too short), the image sensor may have too little exposure and the measured data may be inaccurate. On the other hand, if the shutter frequency is too low, the measured data from the image sensor may not accurately indicate actual location during movement and the reaction of the device would be too slow.

Figure 8:
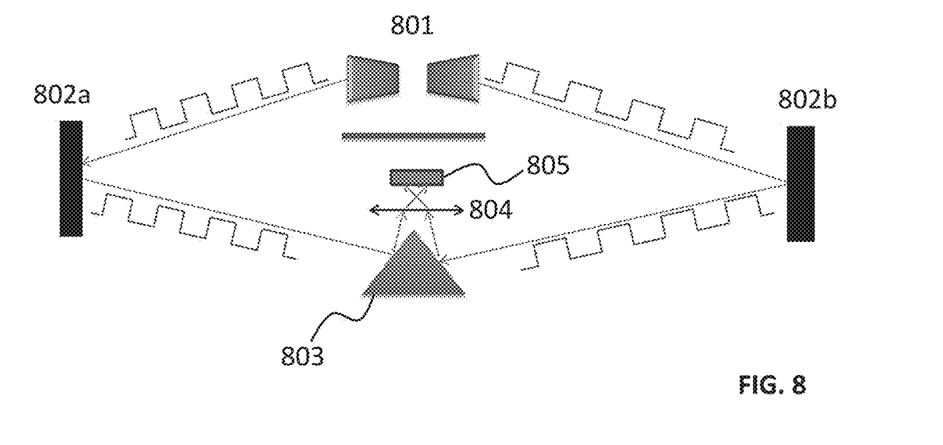
FIG. 8 illustrates another example of the reception element using a circular cone reflector to reflect light to the image sensor.

FIG. 8 illustrates another example of a reception element adapted to project light to the image sensor. Similar to FIG. 4, the light module (801) in FIG. 8 projects light to approximately surround the device and onto objects (802a) and (802b) that reflect the light back to the device. Instead of using a fisheye lens (FIG. 4), the light is reflected by a circular cone reflector (803) and is then projected, through a focusing lens (804), to the image sensor (805).

As illustrated in FIG. 8, the circular cone reflector (803) is adapted to collect light from a horizontal 360° angle. The cone reflector (803) may have a 45° angle of the side to the base. The sides of the cone reflector can be straight or curved, based on the desired detection range at the vertical direction. The light reflected from the objects (802a) and (802b) can be projected to different locations of pixels on the image sensor (805). The angle/direction of the object relative to the device may be calculated based on the location of the pixel(s) that receives the light and a distortion parameter of the combination of cone reflector (803) and focusing lens (804) in a similar scenario as described in FIG. 6. The distance of the object relative to the device may be calculated using the phase shift method as described in FIG. 7.

Figure 9A:
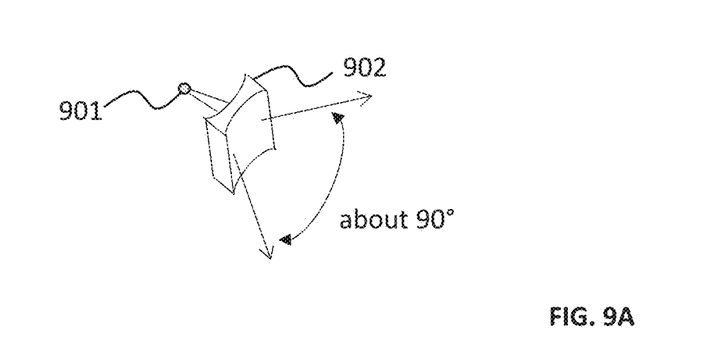
FIG. 9A illustrates an example of the beam-shaping element that uses a concave surface lens to expand light at the horizontal direction.

FIG. 9A illustrates an example of the beam-shaping element that uses a concave surface lens to expand the light. If a light source (901) emits light in a small angle at both vertical and horizontal directions, a concave surface lens (902) may be used to expand the light only at the horizontal direction. For example, the concave surface lens (902) may expand a light source with small angle (e.g., 10°, 30°, 45°) to about 90° at the horizontal direction, while the vertical angle of the light may remain unaffected. Alternatively, other types of lens or a combination of multiple lens may be used to expand the light at the desired direction.

Figure 9B:
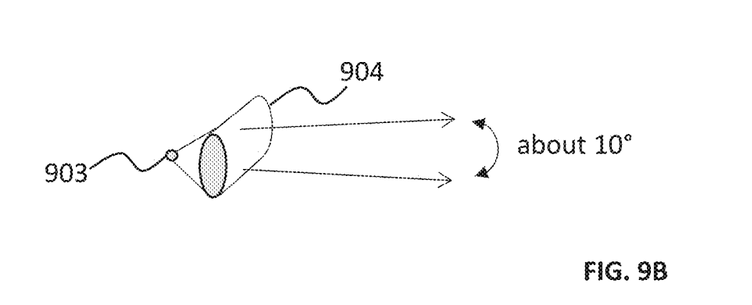
FIG. 9B illustrates another example of the beam-shaping element that uses a cylindrical lens to concentrate the light at the vertical direction.

For a light source (903) that has a large angle, as illustrated in FIG. 9B, another type of beam-shaping element such as a cylindrical lens (904) may be used to concentrate the light at the vertical direction. For example, the emitted light that covers a 90° angle at both horizontal and vertical directions may be concentrated to a smaller angle (e.g., 10°, 30°, 45°) at the vertical direction, leaving the horizontal 90° angle unchanged, so as to concentrate the energy of the light in the horizontal plane.

Figure 10:
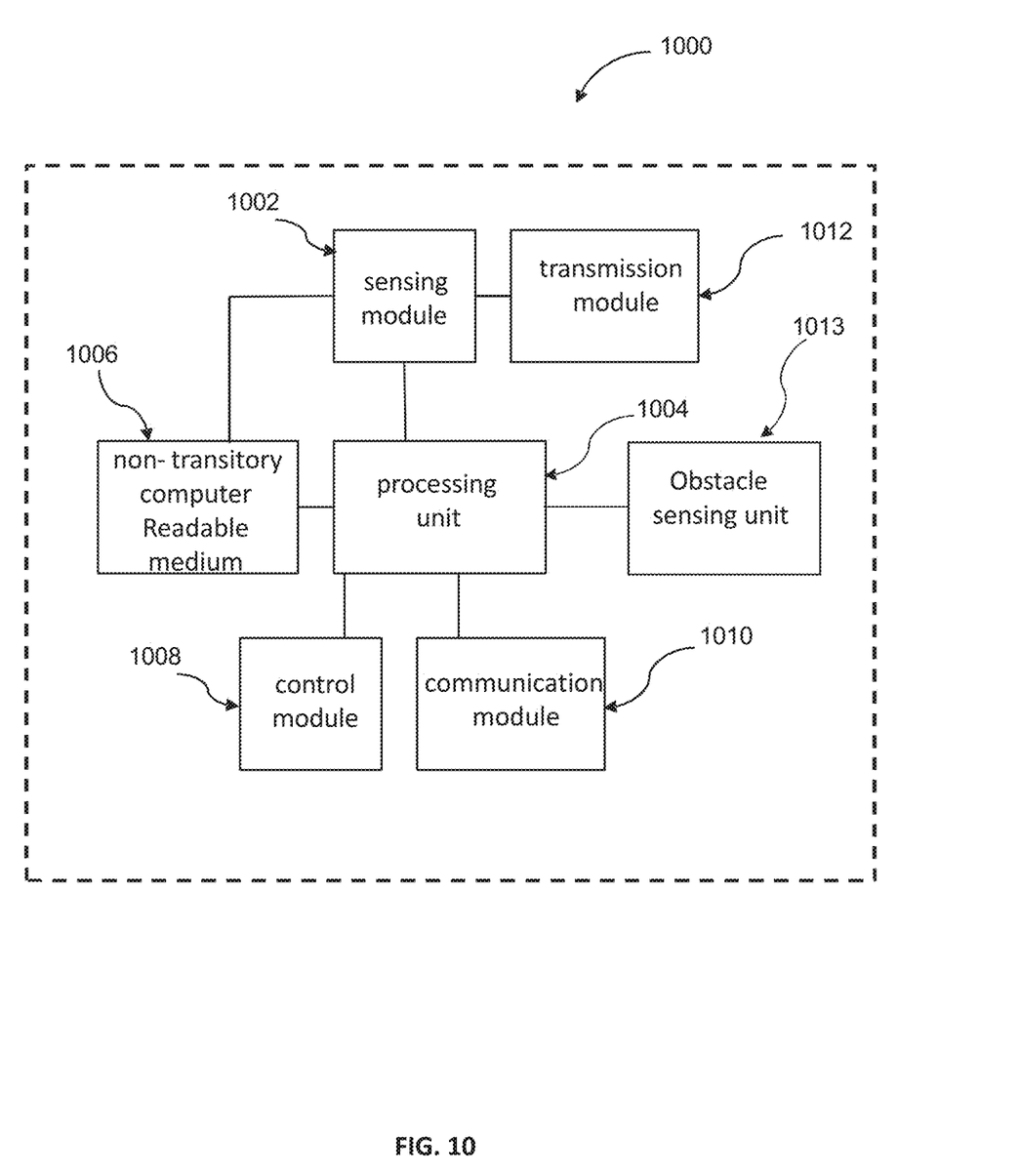
FIG. 10 is a schematic illustration by way of block diagram of a system for controlling a movable object.

The device of the present disclosure, in some embodiments, may be part of a movable object (e.g., an UAV) or be coupled to a movable object. As provided, the movable object may be a driverless car, a car with driving assistance functions, or an UAV. FIG. 10 is a schematic illustration by way of block diagram of a system 1000 for controlling the aircraft/UAV, in accordance with some embodiments. The system 1000 can be used in combination with any suitable embodiment of the systems, devices, and methods disclosed herein. The system 1000 can include, in addition to an obstacle sensing unit 1013 (obstacle sensor) which can be a device of the present disclosure, a sensing module 1002 (sensor), processing unit 1004 (processor), non-transitory computer readable medium 1006, control module 1008 (controller), and communication module 1010 (communication circuit).

The sensing module 1002 can utilize different types of sensors that collect information relating to the aircrafts in different ways. Different types of sensors may sense different types of signals or signals from different sources. For example, the sensors can include inertial sensors, GPS sensors, proximity sensors (e.g., lidar), a radar unit, or vision/image sensors (e.g., a camera). The sensing module 1002 can be operatively coupled to a processing unit 1004 having a plurality of processors. In some embodiments, the sensing module can be operatively coupled to a transmission module 1012 (transmitter) (e.g., a Wi-Fi image transmitter) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the aircraft. For example, the control module 1008 can be configured to control the propulsion mechanisms of the aircraft to adjust the spatial disposition, velocity, and/or acceleration of the aircraft with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication. For example, the communication module 1010 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1010 can transmit and/or receive one or more of sensing data from the sensing module 1002, processing results produced by the processing unit 1004, predetermined control data, user commands from a terminal or remote controller, and the like.

The components of the system 1000 can be arranged in any suitable configuration. For example, one or more of the components of the system 1000 can be located on the aircraft, carrier, payload, terminal, sensing system, or an additional external device in communication with one or more of the above. Additionally, although FIG. 10 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the aircraft, carrier, payload, terminal, sensing module, additional external device in communication with one or more of the above, or suitable combinations thereof, such that any suitable aspect of the processing and/or memory functions performed by the system can occur at one or more of the aforementioned locations.

Figure 11:
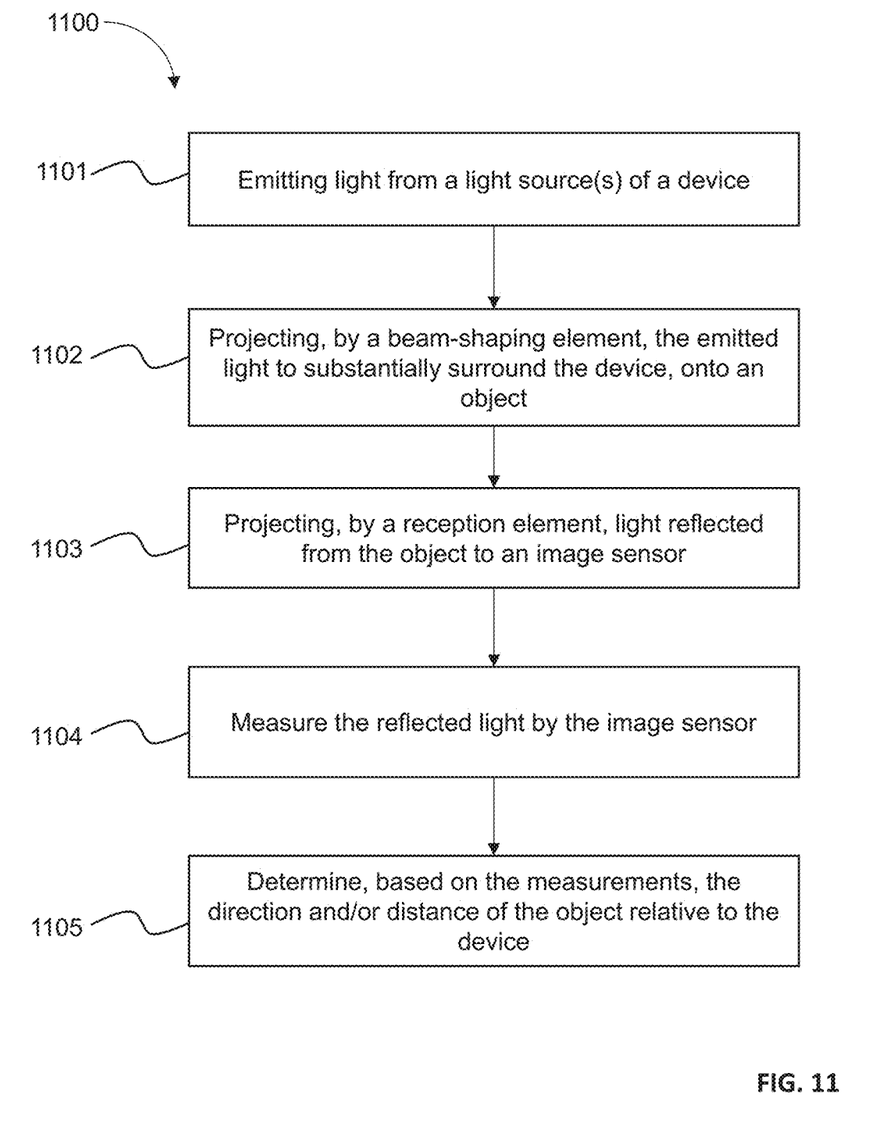
FIG. 11 is a flow chart of detecting an object, in accordance with an embodiment of the disclosure.

FIG. 11 is a flow chart illustrating a method of detecting an object, in accordance with an embodiment of the disclosure. At step 1101, light is emitted from one or more light sources of a device. At step 1102, the emitted light is projected by a beam-shaping element to substantially surround the device. As part of the step 1102, the emitted light is projected onto an object in the same plane of the device, and the light is reflected back to the device. At step 1103, the light reflected from the object is projected by a reception element to an image sensor. At step 1104, the reflected light is measured by the image sensor. Optionally as part of the step 1104, the location of pixel(s) that captures the reflected light is obtained. Alternatively and/or additionally, light intensity of the reflected light is measured (e.g., $Q_A$ and $Q_B$ as illustrated in FIG. 7). The measurements may be sent to a processing unit for calculation. At step 1105, the direction and/or distance of the object is determined by the processing unit based on the measurements at the image sensor.

A few example embodiments are described below. In one embodiments, provided is an apparatus that comprises a light source adapted to emit light; a beam-shaping element adapted to project the light to substantially surround the apparatus in a plane, the light being projected onto an object in the plane and reflected; a reception element adapted to project the light reflected from the object in the plane to an image sensor, wherein a distortion parameter of the reception element in conjunction with a difference between the emitted light and the reflected light detected at the image sensor is indicative of at least one of direction or distance of the apparatus relative to the object.

In some embodiments, the light source comprises one of a light emitting diode or a laser diode. In some embodiments, the light source further comprises circuitry adapted to modulate the light emitted therefrom. In some embodiments, the light emitted from the light source comprises a light pulse having a span in the order of nanoseconds. In some embodiments, the light emitted from the light source comprises a plurality of light pulses comprising a periodic wave signal. In some embodiments, the wave signal comprises a phased periodic wave signal having a predetermined frequency. In some embodiments, the difference between the emitted light and the reflected light detected at the image sensor is a phase difference.

In some embodiments, the beam-shaping element comprises two or more beam-shaping units which collectively project the light to substantially surround the apparatus in the plane. In some embodiments, the apparatus comprises two or more light sources, the light emitted from each of which is projected by a respective beam-shaping unit. In some embodiments, each beam-shaping unit comprises a concave surface lens adapted to expand the coverage of the light emitted from the respective light source.

In some embodiments, wherein the beam-shaping element comprises a cone reflector adapted to expand the coverage of the light emitted from the light source. In some embodiments, the beam-shaping element is adapted to project the light in a perpendicular direction relative to the plane to less than about 45 degrees. In some embodiments, the beam-shaping element is adapted to project the light in a perpendicular direction relative to the plane to less than about 30 degrees.

In some embodiments, the reception element comprises a fisheye lens. In some embodiments, the reception element comprises a cone reflector. In some embodiments, the cone reflector has a straight surface or a curved surface. In some embodiments, the reception element further comprises a focusing lens to focus the light onto the image sensor.

In some embodiments, the direction of the apparatus relative to the object is a function of the distortion parameter of the reception element. In some embodiments, the direction of the apparatus relative to the object is additionally a function of an angle at which the reflected light is received by the image sensor. In some embodiments, the direction of the apparatus relative to the object is additional a function of an angle at which the reflected light is received by the image sensor adapted to measure intensity of the reflected light.

In some embodiments, the apparatus further comprises at least two shutter elements operatively connected to the image sensor, wherein the at least two shutter elements are adapted to open and close such that a phase difference between the light upon emission and the light upon reception is detectable. In some embodiments, the apparatus further comprises a processing unit adapted to calculate the distance of the apparatus relative to the object based upon the phase difference, speed of the light traveling through a medium in which the apparatus is located, and a frequency of the light. In some embodiments, each of the at least two shutter elements comprises a capacitor, wherein the capacitance of the at least two shutter elements is indicative of an exposure to the light. In some embodiments, each of the at least two shutter elements operates at a frequency ranging between about 5 Hertz to about 1 kHertz.

In some embodiments, wherein the image sensor further comprises one or more pixels adapted to detect the light upon reaching the image sensor and measure intensity of the light. In some embodiments, the image sensor comprises a complementary metal oxide semiconductor (CMOS) image sensor. In some embodiments, the apparatus comprises one of an unmanned aerial vehicle, an unmanned wheeled vehicle, or an unmanned watercraft.

Also provided, in one embodiment, is a drone, comprising one or more light sources adapted to emit light; one or more beam-shaping optics adapted to effectuate 360 degrees of coverage of the emitted light, wherein the coverage surrounds one or more portions of the drone about the drone's horizontal periphery, and one or more receiving optics adapted to project the light upon being reflected from an obstacle to an image sensor, wherein at least one of direction or distance of the drone relative to the obstacle is a function of one or more optical parameters of the receiving optics and a difference in phase between the emitted light and the reflected light detected by the image sensor.

In another embodiment, the disclosure provides a system, comprising an array of light sources adapted to radiate light up to 360 degrees about a periphery of a drone to which the system is operatively connected; at least one optical element adapted to receive the radiated light being emitted from the array of light sources and reflected from one or more objects about the periphery of the drone; and an image processing element adapted to determine a phase difference between the radiated and reflected light, relative angle at which the reflected light is received at the image processing element.

In another embodiment, the disclosure provides a method, comprising receiving data indicative of an intensity of light emitted from a plurality of light sources upon emission from the plurality of light sources and upon reflection from an object in a vicinity of an apparatus in which the plurality of light sources are integrated, wherein the plurality of light sources are optimized by a beam-shaping element such that coverage of the light emitted from the plurality of light sources substantially surrounds the apparatus; and calculating at least one of a direction or a distance of the apparatus relative to the object based upon at least one optical parameter of a reception element integrated into the apparatus and adapted to receive the light upon reflection from the object, and the intensity of the light.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

The invention claimed is:
1. An apparatus, comprising:
a light source configured to emit light;

a beam shaper configured to project the light to substantially surround the apparatus in a plane, the light being projected onto an object in the plane and reflected; and a receiver configured to project the light reflected from the object in the plane to an image sensor, wherein a distortion parameter of the receiver in conjunction with a difference between the emitted light and the reflected light detected at the image sensor is indicative of at least one of a direction or a distance of the apparatus relative to the object.

2. The apparatus of claim 1, wherein the light source further comprises circuitry configured to modulate the light emitted therefrom.

3. The apparatus of claim 1, wherein the light emitted from the light source comprises a plurality of light pulses comprising a periodic wave signal.

4. The apparatus of claim 1, wherein the difference between the emitted light and the reflected light detected at the image sensor is a phase difference.

5. The apparatus of claim 1, wherein the beam shaper comprises a cone reflector adapted to expand a coverage of the light emitted from the light source.

6. The apparatus of claim 1, wherein the beam shaper is configured to project the light in a perpendicular direction relative to the plane to less than about 45 degrees.

7. The apparatus of claim 1, wherein the image sensor comprises a complementary metal oxide semiconductor (CMOS) image sensor.

8. The apparatus of claim 1, wherein the apparatus comprises one of an unmanned aerial vehicle, an unmanned wheeled vehicle, or an unmanned watercraft.

9. The apparatus of claim 1, wherein the beam shaper comprises two or more optical components which collectively project the light to substantially surround the apparatus in the plane.

10. The apparatus of claim 9, wherein:
the light source is a first light source, the light emitted from the first light source being projected by a first one of the optical components;
the apparatus further comprising:
a second light source, the light emitted from the second light source being projected by a second one of the optical components.

11. The apparatus of claim 10, wherein:
the first one of the optical components comprises a first concave surface lens configured to expand a coverage of the light emitted from the first light source; and
the second one of the optical components comprises a second concave surface lens configured to expand a coverage of the light emitted from the second light source.

12. The apparatus of claim 1, wherein the receiver comprises at least one of a fisheye lens or a cone reflector.

13. The apparatus of claim 12, wherein the receiver further comprises a focusing lens to focus the light onto the image sensor.

14. The apparatus of claim 1, wherein the direction of the apparatus relative to the object is a function of at least one of the distortion parameter of the receiver or an angle at which the reflected light is received by the image sensor.

15. The apparatus of claim 14, wherein the image sensor is configured to measure intensity of the reflected light.

16. The apparatus of claim 1, further comprising at least two shutters operatively connected to the image sensor, wherein the at least two shutters are configured to open and close such that a phase difference between the light upon emission and the light upon reception is detectable.

17. The apparatus of claim 16, further comprising a processor configured to calculate the distance of the apparatus relative to the object based upon the phase difference, speed of the light traveling through a medium in which the apparatus is located, and a frequency of the light.

18. The apparatus of claim 17, wherein each of the at least two shutters comprises a capacitor, wherein a capacitance of the at least two shutters is indicative of an exposure to the light.

19. A drone, comprising:
one or more light sources configured to emit light;
one or more beam shapers configured to effectuate 360 degrees of coverage of the emitted light, wherein the coverage surrounds one or more portions of the drone about the drone's horizontal periphery; and
one or more receivers configured to project the light upon being reflected from an obstacle to an image sensor, wherein at least one of a direction or a distance of the drone relative to the obstacle is a function of one or more optical parameters of the one or more receivers and a difference in phase between the emitted light and the reflected light detected by the image sensor.

20. A method, comprising:
receiving data indicative of an intensity of light emitted from a plurality of light sources upon emission from the plurality of light sources and upon reflection from an object in a vicinity of an apparatus with which the plurality of light sources are integrated, wherein the plurality of light sources are optimized by a beam shaper such that coverage of the light emitted from the plurality of light sources substantially surrounds the apparatus; and
calculating at least one of a direction or a distance of the apparatus relative to the object based upon:
at least one optical parameter of a receiver integrated with the apparatus and configured to receive the light upon reflection from the object, and
an intensity of the light.

* * * * *